Jan. 7, 1958
A. HUDSON
2,819,098
CLAMP FOR WIRE IN ELECTRIC OUTLET BOXES
Filed Oct. 20, 1954
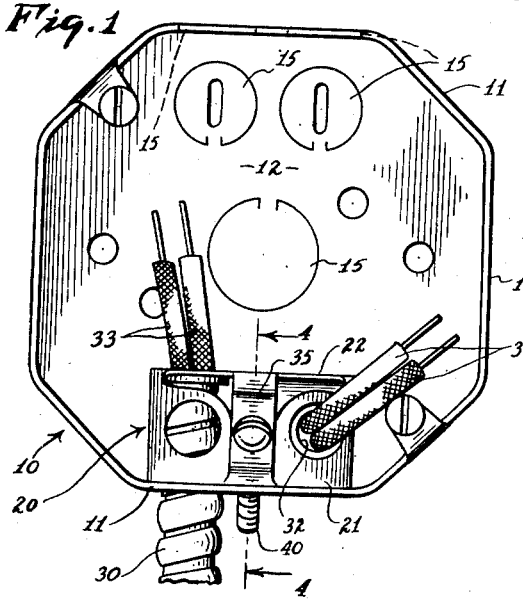
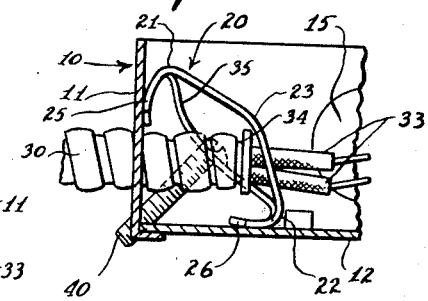
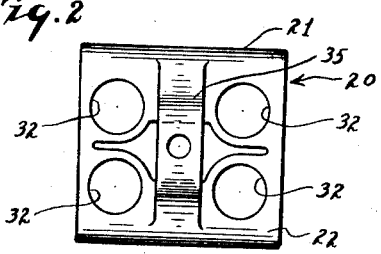
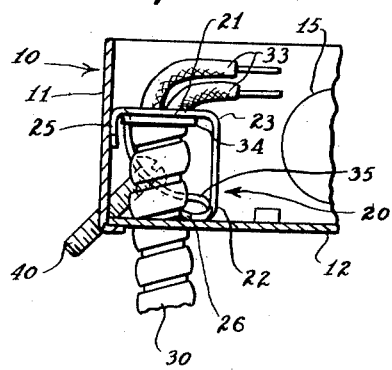
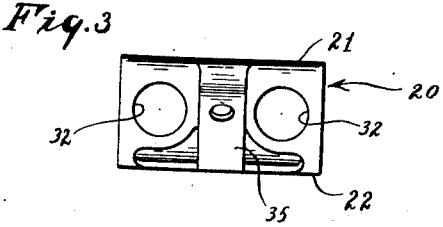
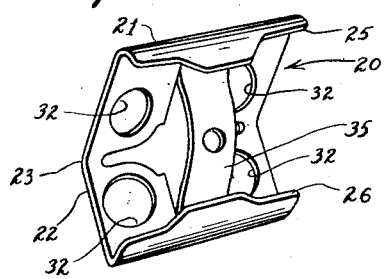
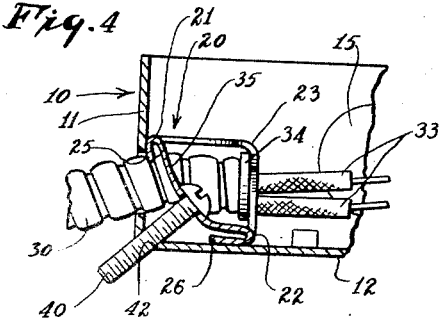
INVENTOR.
Arthur Hudson
BY Emery, Varney,
Whittemore & Dix
ATTORNEYS

United States Patent Office 2,819,098
Patented Jan. 7, 1958

2,819,098

CLAMP FOR WIRE IN ELECTRIC OUTLET BOXES

Arthur Hudson, Ambridge, Pa., assignor to National Electric Products Corporation, Pittsburgh, Pa., a corporation of Delaware Application October 20, 1954, Serial No. 463,425

5 Claims. (Cl. 285—129)

This invention relates to clamps for holding the ends of armored electric cables in outlet and connection boxes of an electrical wiring system.

It is an object of the invention to provide an improved clamp for an electric outlet box and more especially to provide a clamp which works equally well on cables brought in through either the side or the back of the box, and capable of clamping such cables simultaneously.

Another object is to provide a clamp, of the character indicated, which is of simple and inexpensive construction, and which is installed conveniently with a minimum of labor.

In the preferred construction of the invention, the clamp is made with top and front portions having downwardly and inwardly bent clamping jaws, and having a tensioning portion made by striking a strip from the adjoining top and front portions to form an upwardly concave connection for pulling the top and front walls toward one another to actuate the clamping jaws. When the mid-region of the tensioning element is pulled toward a bottom corner of the box, the top and front portions of the clamp are drawn toward the bottom and side, respectively, and the clamping jaws are brought into firm engagement with the armor of any electric cables which project through openings in the side or bottom of the box at locations adjacent to the bottom corner of the box.

Other objects, features and advantages of the invention will appear and be pointed out as the description proceeds.

In the drawing, forming a part hereof, in which like reference characters indicate corresponding parts in all views;

Figure 1 is a top plan view of an electric outlet box with cables extending through one side and through one bottom opening of the box and with the cables secured to the box by the clamp of this invention;

Figure 2 is a front view of the clamp shown in Figure 1, before inserting the clamp in the box;

Figure 3 is a top view of the clamp shown in Figure 1;

Figure 4 is a sectional view taken on the line 4—4 of Figure 1, but with the clamp pulled down into clamping position;

Figure 5 is an end view of the clamp in its initial position in the box before being brought into contact with the electric cable;

Figure 6 is a view similar to Fig. 5 showing a vertical cable in clamped position, with the horizontally extending cable omitted for clearer illustration; and Figure 7 is a perspective view of the clamp shown in Figures 2 and 3.

An electric outlet box 10 has side walls 11 and a bottom wall 12. There are knockouts 15 in both the side walls and bottom walls. There are knockouts 15 in the bottom wall 12 below small knockouts in the side wall. It will be understood that the invention can be applied to other shapes of boxes and to boxes with different numbers of knockouts; but the particular shape of clamp illustrated in the drawing is intended for use with boxes having adjacent knockouts in the side and bottom walls.

A clamping element 20 fits into the box corner formed by any side wall 11 and the bottom wall 12. The clamping element 20 has a top portion 21 and a front portion 22 which meet at adjacent sides along a line of juncture 23. At the other side of the top portion 21, there is a downwardly extending clamping jaw 25; and at the other side of the front portion 22, there is another clamping jaw 26 which extends toward a side of the box. These clamping jaws 25 and 26 have edges for engaging in the helical seam of an armored electric cable 30.

The clamping element 20 is preferably of one piece construction. Part of the top portion 21 and front portion 22 are punched out to provide openings 32 through which wires 33 are led into the center region of the box. These openings 32 are preferably made smaller than the cross section of the armor of the electric cables 30 with which the clamping element is intended to be used. Thus the inside faces of the top portion 21 and the front portion 22, around the openings 32, serve as abutments for limiting the extent to which a cable 30 can be inserted in the box. After a bushing 34 at the end face of the armor of the cable abuts against the clamping element, the cable is preferably pulled back for a distance equal to several convolutions of the armor so as to allow clearance for the top and front portions of the clamping element to move downwardly and inwardly when bringing the clamping jaws 25 and 26 into contact with the side of the cable armor. This is not essential, however, because the clamping element will itself push the cables back before the jaws become firmly clamped in one of the convolutions of the armor seam.

The clamping element 20 has a tensioning portion 35 which is used to pull the top and front portions of the clamp together and to bring the jaws 25 and 26 against the sides of the cable 30. This tensioning portion 35 is of one piece construction with the rest of the clamp and it is formed by displacing part of the top portion 21 and front portion 22 downwardly and inwardly so that they form a strip connected at its opposite ends with the top and front portions, and bent so that its surface confronting the box corner is convex.

There is a centrally located hole at the mid region of the tensioning portion 35, and a screw 40 is inserted through the hole and into a threaded opening 42 (Figure 4) at the corner of the box 10. As the screw 40 is rotated in a direction to screw it downwardly, the center of the tensioning portion 35 is pulled downwardly toward the corner of the box and this movement pulls the top portion 21 toward the bottom of the box and the front portion 22 toward the side wall of the box. Figure 5 shows the initial condition of the clamping element 20 and Figure 4 shows the condition of the clamping element after the tensioning portion or strip 35 has been pulled down by the screw 40.

In the preferred construction, the junctures of the tensioning element 35 with the top and front portions of the clamping elements are preferably near the junctures of the top and front portions with the clamping jaws 25 and 26. A mechanical advantage gaining greater displacement of the jaws is obtained if the tensioning strip 35 connects with the top and front portions of the clamping element nearer to the juncture line 23, but such a construction reduces the clamping pressure which can be exerted against the cables 30 by any given tension of the screw 40. The construction illustrated provides a firm clamping pressure when the screw is turned with an ordinary hand screwdriver and without applying great force to the screwdriver.

The preferred embodiment of the invention has been illustrated and described but changes and modifications can be made and some features can be used in different combinations without departing from the invention as defined in the claims.

What is claimed is:

1. The combination with an electric outlet box that has a bottom wall and side walls which meet the bottom wall in a corner, and which has knockouts in both the side and bottom walls adjacent to said corner, of a clamping element having a top portion and having a front portion which meets the top portion along a line of juncture from which the top and front portions diverge from one another toward the vertex of an adjacent corner of the box in which the clamping element is placed, a downwardly extending clamping jaw connected with the top portion of the clamping element along an edge remote from the line of juncture, an inwardly extending clamping jaw connected with the front portion of the clamping element along an edge remote from said line of juncture, both the top and front portions of the clamping element having openings therein in position to receive wires from armored cables that are lead into the box through knockouts in the side and bottom walls in the region of the clamping element, a tensioning portion connected with the top and front portions of the clamping element at regions adjacent to the clamping jaws, the tensioning portion of the clamping element having an opening substantially midway between its upper and lower ends for receiving a screw, and the upper and lower parts of the tensioning portion diverging from one another in a direction away from the adjacent bottom corner of the box, and a screw extending diagonally from said corner through the tensioning portion and through the corner of the box for pulling the tensioning element toward the corner of the box with resulting pressure on the top and front portions of the clamping element for flexing the clamping element along said line of juncture and producing downward and inward motion of the jaws of the top and front portions, respectively.

2. A clamping element for holding armored cables that extend into an electric outlet box through a side wall and bottom of the box adjacent to a corner at which the bottom and side wall meet, said clamping element having a top portion which initially slopes upwardly toward the side of the box before the clamping element is drawn into clamping relation with a cable, a front portion that initially slopes downwardly and away from the side of the box, a downwardly extending clamping jaw connected with the top portion along the edge adjacent to the side of the box, the downwardly extending jaw being curved and having a convexly curved face confronting the side of the box, an inwardly extending clamping jaw connected with the front portion of the clamping element and having a convexly curved face confronting the bottom of the box, the top and front portions and the clamping jaws being of one piece construction and said top and front portions having openings therein smaller than the cross section of the armor of the cable with which the clamping element is intended to be used so that the top and front portions of the clamping element provide abutments for limiting the extent to which the armor of the cable extends into the box while providing said openings for passage of the wires that extend from the cables, and a tensioning portion of the clamping element, of one piece construction with the remainder of the clamping element and comprising a strip with its upper and lower ends connected with the top and front portions, respectively, of the clamping element and having an opening midway between its upper and lower ends for receiving a screw, the strip being initially curved so that its face confronting the bottom corner of the box is convex, and a screw which passes through the center opening in the tensioning portion of the clamp and which threads through an opening in the bottom corner of the box for pulling the mid-portion of the tensioning strip downwardly toward the corner of the box to exert a simultaneously downward and inward pull on the top and front portions of the clamping element when operating said element to bring the jaws into contact with the armor of the cables that extend into the box through the side and bottom of the box adjacent to the said corner.

3. The clamping element described in claim 2 with two clamping jaws along the top portion and two clamping jaws along the front portion, and with the tensioning strip located midway between the opposite ends of the clamping element and connected with the top and front portions at regions adjacent to the jaws.

4. A clamping element for holding armored cable in an electric outlet box which has a bottom wall and side walls that meet the bottom wall at a corner, and which has knockouts in both the bottom wall and the side walls at regions adjacent to said corner, the clamping element including a top portion and a front portion that meets the top portion in an angle along a line of juncture, the clamping element being made of material that is flexible at least at said line of juncture, a downwardly extending clamping jaw connected with the top portion at the side remote from its juncture with the front portion, an inwardly extending clamping jaw connected with the front portion at its edge remote from the juncture of the top and front portions, and a tensioning portion connected at its upper end to the top portion of the clamping element and connected at its lower end to the front portion of the clamping element, the tensioning portion being connected with both the top and front portions only at its ends and at a substantial distance back from the juncture line at which these portions meet with one another and nearer to the jaws than to the junction line, and means at a mid-region of the tensioning portion for pulling said mid-region of the tensioning portion downwardly and inwardly toward the corner of the box to distort the clamping element and force the juncture line away from the corner of the box while pulling the clamping jaws closer to the corner of the box and into contact with armored cables lead into the box through knockout openings in either the side or bottom wall of the box.

5. A clamping element for simultaneously holding armored cables which are lead inwardly through openings in a side wall and bottom of an electric outlet box at regions near a corner of the box where the side wall meets the bottom, said clamping element comprising a single piece of metal with clamping jaws at opposite edges of an intermediate part that has top and front portions that meet along a line where the material is bent so that the side of the intermediate part confronting the corner of the box is generally concave, and a tensioning strip connected at its opposite ends to the remainder of the clamping element near the clamping jaws and shaped so that the face of the strip confronting the corner of the box is convex, and means for pulling the mid-region of the strip downwardly to increase its convexity and distort the clamping element by increasing the concavity of the bend of said intermediate part and pulling the clamping jaws toward one another and toward a corner of the box when the clamping element is positioned in a box.

References Cited in the file of this patent

UNITED STATES PATENTS

| 1,016,030 | Palmer | Jan. 30, 1912 |
| 1,024,949 | Munger | Apr. 30, 1912 |
| 1,092,261 | Hoffman | Apr. 7, 1914 |
| 1,783,356 | Cook | Dec. 2, 1930 |
| 1,820,626 | Newman et al. | Aug. 25, 1931 |
| 2,437,073 | Carlson | Mar. 2, 1948 |

FOREIGN PATENTS

| 3,841 | Great Britain | Feb. 12, 1897 |